United States Patent
Yun et al.

(10) Patent No.: US 11,913,773 B2
(45) Date of Patent: Feb. 27, 2024

(54) NON-DESTRUCTIVE METHOD FOR MEASURING THICKNESS OF THREE-LAYERED REINFORCED HYDROGEN ION EXCHANGE MEMBRANE FOR FUEL CELL

(71) Applicant: LG CHEM, LTD., Seoul (KR)

(72) Inventors: Sung-Hyun Yun, Daejeon (KR); Joo-Yong Park, Daejeon (KR); Ji-Hun Kim, Daejeon (KR); Jae-Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 650 days.

(21) Appl. No.: 17/057,937

(22) PCT Filed: May 20, 2019

(86) PCT No.: PCT/KR2019/005974
§ 371 (c)(1),
(2) Date: Nov. 23, 2020

(87) PCT Pub. No.: WO2019/225919
PCT Pub. Date: Nov. 28, 2019

(65) Prior Publication Data
US 2021/0207946 A1    Jul. 8, 2021

(30) Foreign Application Priority Data
May 24, 2018 (KR) .................. 10-2018-0059100

(51) Int. Cl.
*H01M 8/1053* (2016.01)
*G01B 11/06* (2006.01)
(Continued)

(52) U.S. Cl.
CPC ..... *G01B 11/0633* (2013.01); *G01N 21/8422* (2013.01); *H01M 8/1053* (2013.01);
(Continued)

(58) Field of Classification Search
CPC ........... G01B 11/0633; G01B 11/0625; G01B 11/06; G01N 21/8422; G01N 2021/8438;
(Continued)

(56) References Cited

U.S. PATENT DOCUMENTS

| 7,012,699 B2 | 3/2006 | Shinya et al. |
| 2008/0107803 A1 | 5/2008 | Kwon |

(Continued)

FOREIGN PATENT DOCUMENTS

| CN | 101294795 A | 10/2008 |
| JP | 11-51618 A | 2/1999 |

(Continued)

OTHER PUBLICATIONS

International Search Report for PCT/KR2019/005974 dated Aug. 20, 2019.
(Continued)

*Primary Examiner* — Jonathan M Hansen
(74) *Attorney, Agent, or Firm* — Birch, Stewart, Kolasch & Birch, LLP

(57) ABSTRACT

The present invention relates to a method of non-destructively measuring a thickness of a reinforcement membrane, and more particularly, to a method of non-destructively measuring a thickness of a hydrogen ion exchange reinforcement membrane for a fuel cell, in which the reinforcement membrane has a symmetric three-layer structure including a reinforcement base layer and pure water layers disposed at opposing sides of the reinforcement base layer, including performing total non-destructive inspection and omitting a process of analyzing a position by means of a thickness peak of a power spectrum of the respective layers of the reinforcement membrane.

4 Claims, 3 Drawing Sheets

(51) Int. Cl.
*G01N 21/84* (2006.01)
*H01M 8/1058* (2016.01)
*H01M 8/10* (2016.01)

(52) U.S. Cl.
CPC .. *H01M 8/1058* (2013.01); *G01N 2021/8438* (2013.01); *H01M 2008/1095* (2013.01); *H01M 2300/0082* (2013.01); *H01M 2300/0094* (2013.01)

(58) Field of Classification Search
CPC ............. H01M 8/1053; H01M 8/1058; H01M 2008/1095; H01M 2300/0082; H01M 2300/0094; H01M 8/1062; H01M 8/1067
See application file for complete search history.

(56) References Cited

U.S. PATENT DOCUMENTS

| | | | | |
|---|---|---|---|---|
| 2008/0266550 | A1* | 10/2008 | Nishida | G01N 21/31 356/73 |
| 2015/0159996 | A1 | 6/2015 | Ichikawa et al. | |
| 2016/0370174 | A1* | 12/2016 | Bonino | G01B 11/0616 |
| 2021/0135266 | A1* | 5/2021 | Kim | H01M 8/1086 |

FOREIGN PATENT DOCUMENTS

| | | |
|---|---|---|
| JP | 2005-308394 A | 11/2005 |
| JP | 2008-292473 A | 12/2008 |
| JP | 2012-89538 A | 4/2012 |
| JP | 4978548 B2 | 7/2012 |
| JP | 2015-102439 A | 6/2015 |
| JP | 6363819 B2 | 7/2018 |
| KR | 10-2008-0040225 A | 5/2008 |
| KR | 10-1060380 B1 | 8/2011 |
| KR | 10-2017-0102264 A | 9/2017 |
| KR | 10-1886919 B1 | 9/2018 |

OTHER PUBLICATIONS

European Search Report from European Application No. 19808453.5 dated Apr. 9, 2021.

* cited by examiner

[FIG. 1]
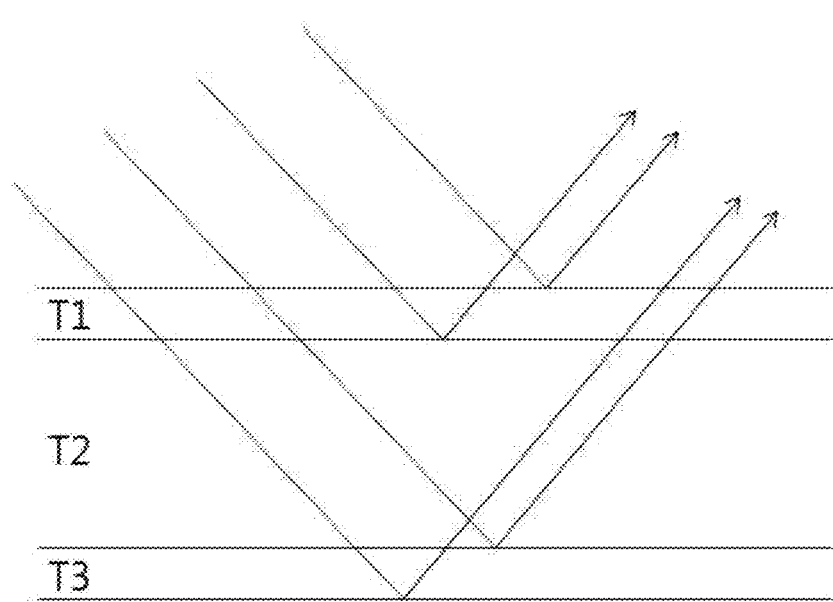

[FIG. 2]
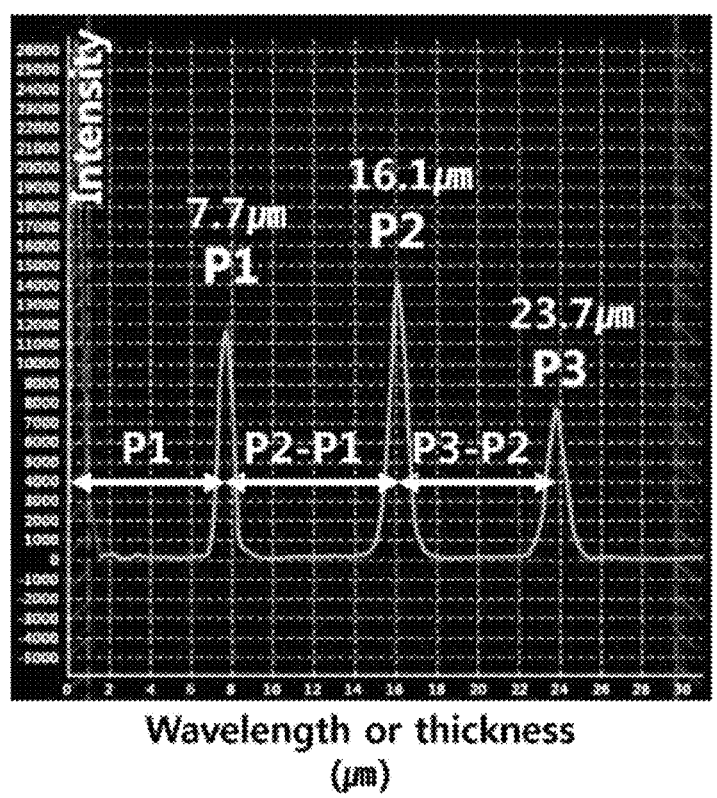

[FIG. 3]
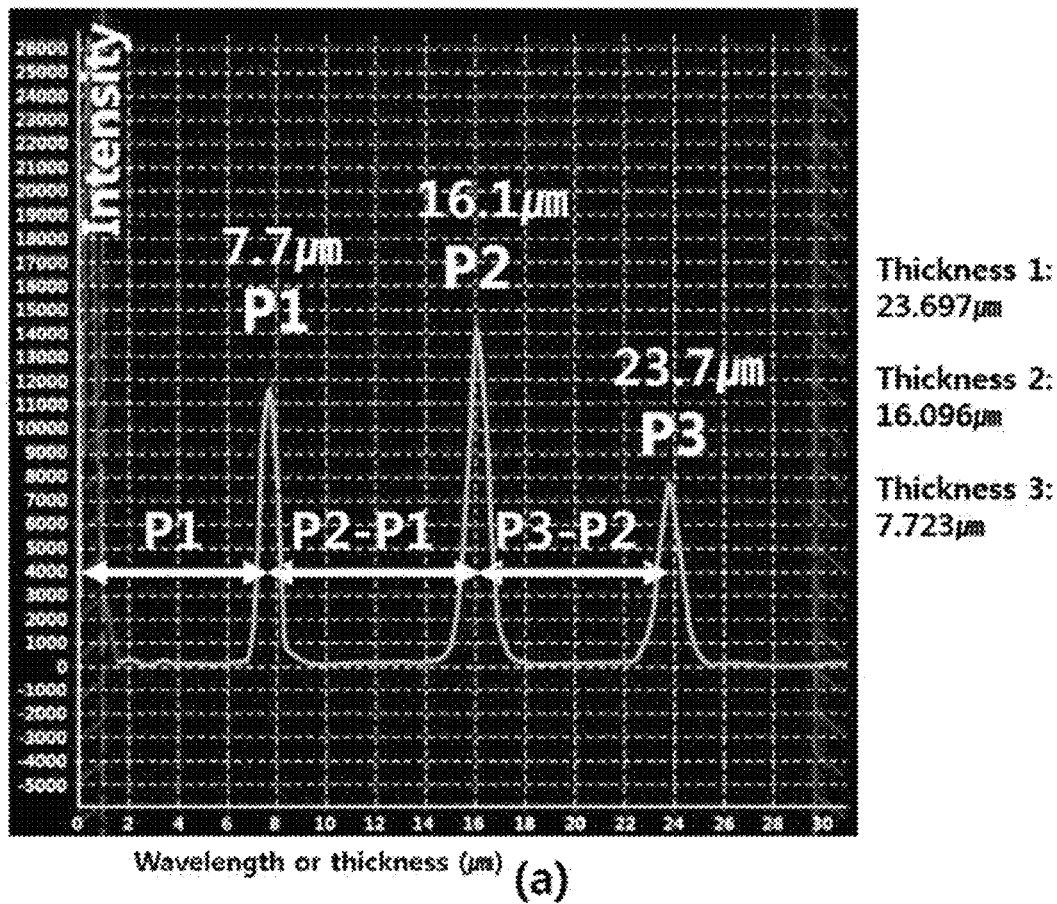
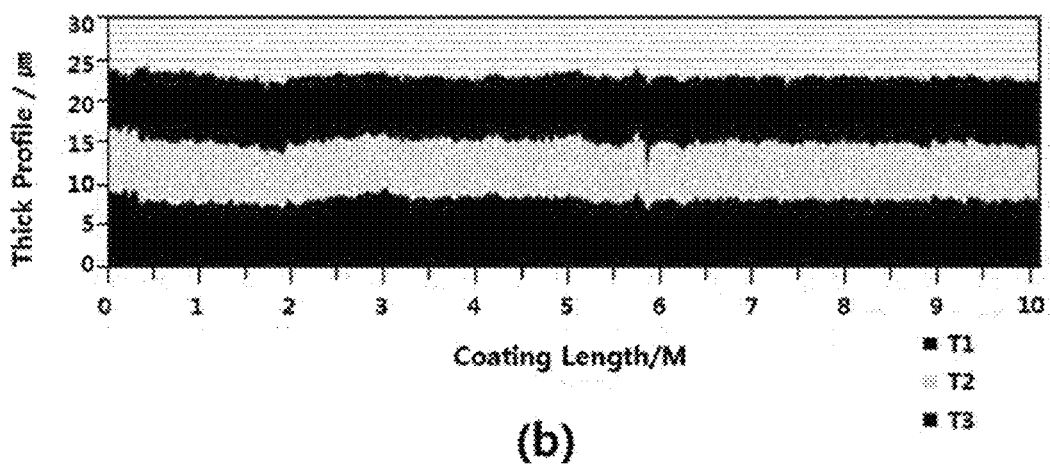

NON-DESTRUCTIVE METHOD FOR MEASURING THICKNESS OF THREE-LAYERED REINFORCED HYDROGEN ION EXCHANGE MEMBRANE FOR FUEL CELL

TECHNICAL FIELD

This application claims priority to and the benefit of Korean Patent Application No. 10-2018-0059100 filed with the Korean Intellectual Property Office on May 24, 2018, the entire contents of which are incorporated herein by reference.

The present invention relates to a method of non-destructively measuring a thickness of a reinforcement membrane, and more particularly, to a method of non-destructively measuring a thickness of a hydrogen ion exchange reinforcement membrane for a fuel cell, in which the reinforcement membrane has a symmetric three-layer structure including a reinforcement base layer and pure water layers disposed at one side and the other side of the reinforcement base layer, the method capable of performing total non-destructive inspection and omitting a process of analyzing a position by means of a thickness peak of a power spectrum of the respective layers.

BACKGROUND ART

A fuel cell separation membrane or a fuel cell reinforcement membrane serves as an insulator and needs to have a function of a separation membrane for separating an oxidation electrode (anode) and a reduction electrode (cathode) as well as a function of hydrogen ion exchange.

To improve durability of the fuel cell reinforcement membrane, a hydrogen ion exchange composite membrane is provided, which has a three-layer structure in which a porous reinforcement base film having mechanical strength is impregnated with a polymer electrolyte, and electrolyte coating layers are formed on upper and lower portions of a porous reinforcement base matrix layer, respectively.

In the related art, a thickness inspection method of inspecting thickness uniformity of the fuel cell reinforcement membrane inputs light into the fuel cell reinforcement membrane and measures a thickness by using reflective light. Further, the method analyzes thicknesses of the respective layers by calculating a light spectrum and a power spectrum by using the reflective light.

In the method of measuring a thickness of a fuel cell reinforcement membrane in the related art, a peak position of the power spectrum indicates an optical distance between interfaces of the respective layers of the fuel cell reinforcement membrane. However, in the case of the fuel cell reinforcement membrane in which the respective layers have the same medium and the same refractive index, it is impossible to analyze where the interface, which allows the peak to be obtained by using only the power spectrum, is positioned with respect to the outermost surface of the fuel cell reinforcement membrane.

In this regard, there is a need for a method of non-destructively measuring a thickness of a reinforcement membrane, which is capable of independently and precisely measuring, in a short time, the thicknesses of the respective layers by using the power spectrum without analyzing the positions of the respective layers of the fuel cell reinforcement membrane.

DOCUMENT OF RELATED ART

Patent Document (Patent Document 1) Japanese Patent Application Laid-Open No. 2005-308394

DISCLOSURE

Technical Problem

The present invention has been made in an effort to provide a method of non-destructively measuring a thickness of a fuel cell reinforcement membrane having a three-layer structure in which the respective layers have the same medium, which makes it possible to omit the process of analyzing a position of a thickness spectrum peak.

The present invention has also been made in an effort to provide a method of non-destructively measuring a thickness of a reinforcement membrane, the method capable of analyzing uniformity of an overall thickness, uniformity of a thickness of each cross section, and symmetry of a three-layer cross-sectional structure by calculating a thickness spectrum by using reflective light reflected by interfaces between the respective layers of the reinforcement membrane.

Technical Solution

A method of non-destructively measuring a thickness of a hydrogen ion exchange reinforcement membrane for a fuel cell having a three-layer structure according to an exemplary embodiment of the present invention includes: inputting white light into a hydrogen ion exchange reinforcement membrane for a fuel cell having a three-layer structure; obtaining a light spectrum of the reinforcement membrane by spectrally analyzing the white light reflected by respective layers of the reinforcement membrane and converting the reflected light into an electrical signal; and obtaining a thickness spectrum by calculating thicknesses of the respective layers of the reinforcement membrane with respect to a refractive index of the reinforcement membrane by calculating the light spectrum, in which the reinforcement membrane includes a first ion exchange resin layer positioned at a first side of a porous film and a second ion exchange resin layer provided at a second side of the porous film, and the first ion exchange resin layer has the same thickness as the second ion exchange resin layer.

In one exemplary embodiment, the thickness spectrum may have three peaks.

In one exemplary embodiment, in the light spectrum, a single peak of an upper layer of the porous film and a single peak of a lower layer of the porous film may be identical to each other.

In one exemplary embodiment, the reinforcement membrane may be manufactured by filling the porous film with an ion-conductive hydrophilic polymer such that the first ion exchange resin layer and the second ion exchange resin layer have the same medium.

In one exemplary embodiment, any one of a transfer film and a release film may be attached to one side of one of the first ion exchange resin layer and the second ion exchange resin layer positioned at an outer periphery of the reinforcement membrane.

Advantageous Effects

According to the present invention, since all the respective layers of the fuel cell reinforcement membrane having the three-layer structure have the same medium and the thicknesses of the upper and lower layers of the fuel cell reinforcement membrane are equal or similar to each other, it is possible to analyze the thickness from the position of the thickness spectrum peak, and it is possible to omit the process of analyzing where the respective layers of the reinforcement membrane are positioned with respect to the outer surface.

In addition, it is possible to analyze uniformity of an overall thickness, uniformity of a thickness of each cross section, and symmetry of a three-layer cross-sectional structure by calculating the thickness spectrum by using the reflective light reflected by the interfaces between the respective layers of the reinforcement membrane, and it is possible to improve stability of a reinforcement membrane coating process and reliability of a product coated with the reinforcement membrane.

DESCRIPTION OF DRAWINGS

FIG. 1 is a view schematically illustrating a situation in which white light inputted into a hydrogen ion exchange reinforcement membrane for a fuel cell is reflected.

FIG. 2 is a graph illustrating a thickness spectrum obtained by a non-destructive thickness measuring device.

FIG. 3 is a view illustrating results analyzed by using a method of non-destructively measuring a thickness of a hydrogen ion exchange reinforcement membrane for a fuel cell having a three-layer structure according to the present invention, in which (a) of FIG. 3 is a graph illustrating a thickness spectrum according to an exemplary embodiment, and (b) of FIG. 3 is a profile image of a cross-sectional thickness of the hydrogen ion exchange reinforcement membrane according to the exemplary embodiment.

BEST MODE

Hereinafter, the present invention will be described in detail with reference to the accompanying drawings. Here, repeated descriptions and detailed descriptions of publicly known functions and configurations will be omitted so as to avoid unnecessarily obscuring the subject matter of the present invention. Exemplary embodiments of the present invention are provided to completely explain the present invention to a person with ordinary skill in the art. Therefore, shapes and sizes of elements illustrated in the drawings may be exaggerated for a more apparent description.

Throughout the specification, unless explicitly described to the contrary, the word "comprise" or "include" and variations, such as "comprises", "comprising", "includes" or "including", will be understood to imply the inclusion of stated constituent elements, not the exclusion of any other constituent elements.

Hereinafter, exemplary embodiments are proposed to help understand the present invention. However, the following exemplary embodiments are provided just for more easily understanding the present invention, and the contents of the present invention are not limited by the exemplary embodiments.

<Method of Non-Destructively Measuring Thickness of Reinforcement Membrane>

A method of non-destructively measuring a thickness of a reinforcement membrane according to the present invention may include inputting white light (S100), obtaining a light spectrum (S200), and obtaining a thickness spectrum (S300).

The inputting of the white light (S100) guides and inputs the white light emitted from a light emitting unit into a hydrogen ion exchange reinforcement membrane for a fuel cell having a three-layer structure.

Here, the reinforcement membrane may have the three-layer structure. Ion exchange resin layers (pure water layers) may be positioned at one side and the other side of a porous layer film (or a reinforcement base layer), respectively. The ion exchange resin layers, which are positioned as an upper layer and a lower layer on the reinforcement membrane, may have the same thickness. That is, the reinforcement membrane may be structured to be symmetrical about a centerline of a porous film.

In addition, the reinforcement membrane may be manufactured by filling the porous film with an ion-conductive hydrophilic polymer. In this case, both of one side and the other side of the porous film may be filled with the ion-conductive hydrophilic polymer. Therefore, the ion exchange resin layers, which are positioned at one side and the other side of the porous film, respectively, may have the same medium and the same refractive index.

The reinforcement membrane may further include a transfer film (release film). The transfer film may be positioned at one side of the ion exchange resin layer positioned at an outer periphery of the reinforcement membrane. Because the transfer film has a refractive index different from a refractive index of the ion exchange resin layer and a refractive index of the porous film, it is possible to easily exclude a measurement result from the light spectrum or the thickness spectrum which will be described below. That is, because the transfer film has a thickness larger than an overall thickness of the reinforcement membrane, the transfer film may be set to be out of a range of an analysis limitation and may be excluded from the measurement result.

The thickness measuring method according to the present invention may be used for a method of manufacturing a fuel cell reinforcement membrane. The present invention may have an effect of measuring, in real time, a thickness when a coated film is transferred in an apparatus for manufacturing a fuel cell reinforcement membrane and an effect of performing total non-destructive inspection. In addition, in the obtaining of the light spectrum (S200), when the white light inputted into the reinforcement membrane is reflected by the interfaces between the respective layers of the reinforcement membrane, a spectrometer obtains and spectrally analyzes the reflective light and converts the reflective light into an electrical signal. The converted electrical signal may be used to obtain the light spectrum.

As described in step S100, since the ion exchange resin layers of the reinforcement membrane according to the present invention have the same medium and the same thickness, the reflective light reflected by the interface between the upper and lower layers of the reinforcement membrane may overlap at the same position in the light spectrum. Further, the porous film of the reinforcement membrane may be filled with a medium identical to the medium of the ion exchange resin layers, but a refractive interface may be formed by a difference in optical path distance (interface) of the porous film.

The obtaining of the thickness spectrum (S300) calculates the thicknesses of the respective layers of the reinforcement membrane by calculating the light spectrum obtained by the spectrometer. That is, step S300 may calculate the thicknesses of the respective layers of the reinforcement membrane with the peaks in the light spectrum and the difference in optical path distance between the interfaces by using Fourier transform. Therefore, the thickness spectrum indicates the peaks in order of increasing thickness.

FIG. 1 is a view schematically illustrating a situation in which white light inputted into a hydrogen ion exchange reinforcement membrane for a fuel cell is reflected, and FIG. 2 is a graph illustrating a thickness spectrum obtained by a non-destructive thickness measuring device.

The thickness spectrum according to the present invention may have three peaks. Referring to FIG. 2, the thickness spectrum according to the present invention may have the peaks P1, P2, and P3. Referring to FIG. 1, assuming that in the reinforcement membrane having the three-layer structure, the ion exchange resin layer, which is an uppermost layer, is T1, the porous film is T2, and the ion exchange resin layer, which is a lowermost layer, is T3, P1 in the light spectrum is a peak that indicates thicknesses of T1 and T3, P2 indicates T1+T2, and P3 indicates an overall thickness of the reinforcement membrane. That is, it can be seen that the thickness peaks of T1 and T3 overlap each other at P1 due to the same thickness thereof. Therefore, the thicknesses of T1 and T3 may be calculated by P1 or by (P3−P2). Further, the thickness of T2 may be calculated by (P2−P1).

The object of the present invention is not to analyze which layer the peak in the thickness spectrum indicates and which position on the reinforcement membrane the layer is positioned, but the object of the present invention is to analyze whether the porous film is coated with T1 and T3 having the same or similar thickness by showing the same refractive index and the same peak because the ion exchange resin layers of the reinforcement membrane, that is, T1 and T3 have the medium having the same thickness. Therefore, the present invention may have an effect of improving stability of a reinforcement membrane coating process and reliability of a product coated with the reinforcement membrane by checking for uniformity of the overall thickness of the reinforcement membrane, uniformity of the thicknesses of the respective layers, and symmetry of the three-layer structure.

FIG. 3 is a view illustrating results analyzed by using a method of non-destructively measuring a thickness of a hydrogen ion exchange reinforcement membrane for a fuel cell having a three-layer structure according to the present invention, in which a) of FIG. 3 is a graph illustrating a thickness spectrum according to an exemplary embodiment, and fb) of FIG. 3 is a profile image of a cross-sectional thickness of the hydrogen ion exchange reinforcement membrane according to the exemplary embodiment.

The thickness measuring method according to the present invention non-destructively measures a thickness of a hydrogen ion exchange reinforcement membrane for a fuel cell during a process of manufacturing the hydrogen ion exchange reinforcement membrane, and the method may measure thicknesses of all manufactured reinforcement membranes having different lengths. Therefore, an image of a cross section of the reinforcement membrane may be implemented by using the thickness spectrum according to the present invention.

Referring to (a) of FIG. 3, the thickness spectrum according to the exemplary embodiment indicates the reinforcement membrane in which the thickness of T1 is 7.7 μm, the thickness of T1+T2 is 16.1 μm, and the overall thickness is 23.7 μm. That is, the thickness of the ion exchange resin layer is 7.6 to 7.7 μm, and the thickness of the porous film is 8.3 to 8.4 μm.

Referring to (b) of FIG. 3, it is possible to analyze a cross-sectional profile image by using the thickness spectrum at each point of the reinforcement membrane as illustrated in (a) of FIG. 3. The overall thickness of the reinforcement membrane is 23.7 μm, and it is ascertained that the ion exchange resin layer is formed symmetrically.

<Apparatus for Manufacturing Reinforcement Membrane>

The apparatus for manufacturing a reinforcement membrane according to the present invention may include a coating unit, a laminating unit, a drying unit, and a thickness measuring unit.

The coating unit is configured to provide a coating film coated with a coating liquid, and the coating unit may manufacture the coating film by unwinding the wound porous film, impregnating the porous film with an ion-conductive hydrophilic polymeric liquid, and coating one side and the other side of the porous film.

The laminating unit is configured to attach a transfer film to a lowermost end of the coating film. In this case, the transfer film has a medium different from a medium of the coating film, that is, the ion-conductive hydrophilic polymer, such that the transfer film has a refractive index different from a refractive index of the coating film.

The drying unit is configured to dry the coating film laminated on the transfer film to manufacture a fuel cell reinforcement membrane, and the drying unit may include a furnace for drying a film wet with a polymeric liquid. The drying furnace may stably obtain uniform physical properties of the reinforcement membrane by controlling a rate and a temperature of the furnace.

The thickness measuring unit measures the thicknesses of the respective layers of the fuel cell reinforcement membrane to check a structure horizontally symmetrical based on the porous film, uniformity of the respective layers, and uniformity of the overall thickness of the reinforcement membrane. The thickness measuring unit may be positioned between the laminating unit and the drying unit or may be positioned after the drying unit.

Further, the thickness measuring unit may include a light source module, a spectrometer, and a calculation module. The light source module is configured to emit white light and may input the white light into the reinforcement membrane. The spectrometer is configured to spectrally analyze reflective light, and the spectrometer may convert the reflective light reflected by the reinforcement membrane into an electrical signal and then obtain a light spectrum. The calculation module is configured to obtain a thickness spectrum by performing a predetermined calculation process on the light spectrum created by the spectrometer.

In the case in which the ion exchange resin layers positioned at an outermost periphery of the reinforcement membrane are uniformly applied and have the same or similar thickness, the thickness spectrum may have three types of peaks. In the case in which the reinforcement membrane has an asymmetric structure based on the porous film, the thickness spectrum may have four or more types of peaks.

While the present invention has been described above with reference to the exemplary embodiments, it may be understood by those skilled in the art that the present invention may be variously modified and changed without departing from the spirit and scope of the present invention disclosed in the claims.

The invention claimed is:

1. A method of non-destructively measuring a thickness of a hydrogen ion exchange reinforcement membrane for a fuel cell having a three-layer structure, the method comprising:
   inputting white light into a hydrogen ion exchange reinforcement membrane for a fuel cell having a three-layer structure;

obtaining a light spectrum of the reinforcement membrane by spectrally analyzing the white light reflected by respective layers of the reinforcement membrane and converting the reflected light into an electrical signal; and obtaining a thickness spectrum by calculating thicknesses of the respective layers of the reinforcement membrane with respect to a refractive index of the reinforcement membrane by calculating the light spectrum, wherein the reinforcement membrane comprises a first ion exchange resin layer positioned at a first side of a porous film and a second ion exchange resin layer provided at a second side of the porous film, the first side of the porous film being opposite to the second side of the resin film, wherein the first ion exchange resin layer has the same thickness as the second ion exchange resin layer, wherein any one of a transfer film and a release film is attached to one side of one of the first ion exchange resin layer and the second ion exchange resin layer positioned at an outer periphery of the reinforcement membrane, and wherein a refractive index of the one of the transfer film or the release film is different from a refractive index of the ion exchange resin layer and a refractive index of the porous film.

2. The method of claim 1, wherein the thickness spectrum has three peaks.

3. The method of claim 1, wherein in the light spectrum, a single peak of an upper layer of the porous film and a single peak of a lower layer of the porous film are identical to each other.

4. The method of claim 1, wherein the reinforcement membrane is manufactured by filling the porous film with an ion-conductive hydrophilic polymer such that the first ion exchange resin layer and the second ion exchange resin layer have the same medium.

* * * * *